(12) United States Patent
Chen (10) Patent No.: US 10,457,037 B2
(45) Date of Patent: Oct. 29, 2019

(54) 3-D PRINTING APPARATUS

(71) Applicants: XYZprinting, Inc., New Taipei (TW);
Kinpo Electronics, Inc., New Taipei (TW)

(72) Inventor: Peng-Yang Chen, New Taipei (TW)

(73) Assignees: XYZprinting, Inc., New Taipei (TW);
Kinpo Electronics, Inc., New Taipei (TW)

( * ) Notice: Subject to any disclaimer, the term of this patent is extended or adjusted under 35 U.S.C. 154(b) by 278 days.

(21) Appl. No.: 15/432,946

(22) Filed: Feb. 15, 2017

(65) Prior Publication Data

US 2018/0154587 A1    Jun. 7, 2018

(30) Foreign Application Priority Data

Dec. 1, 2016 (CN) .......................... 2016 1 1087797

(51) Int. Cl.
| | | |
|---|---|---|
| *B29C 64/20* | (2017.01) | |
| *B33Y 30/00* | (2015.01) | |
| *B33Y 50/02* | (2015.01) | |
| *B29C 64/255* | (2017.01) | |
| *B29C 64/135* | (2017.01) | |
| *B29C 64/386* | (2017.01) | |
| *B29K 105/00* | (2006.01) | |

(52) U.S. Cl.
CPC ............ *B33Y 50/02* (2014.12); *B29C 64/135* (2017.08); *B29C 64/20* (2017.08); *B29C 64/255* (2017.08); *B29C 64/386* (2017.08); *B33Y 30/00* (2014.12); *B29K 2105/0058* (2013.01)

(58) Field of Classification Search
CPC .... B29K 2105/0058; B29K 2105/0094; B29C 64/20; B29C 64/255; B33Y 30/00; B33Y 50/02

USPC ...... 425/445, 446, 447, 174, 174.4; 264/401
See application file for complete search history.

(56) References Cited

U.S. PATENT DOCUMENTS

| | | | |
|---|---|---|---|
| 2015/0064298 A1* | 3/2015 | Syao ..................... | B29C 64/124 425/169 |
| 2016/0046080 A1* | 2/2016 | Thomas ................. | B33Y 10/00 264/308 |

FOREIGN PATENT DOCUMENTS

| | | |
|---|---|---|
| CN | 106042388 | 10/2016 |
| CN | 106042389 | 10/2016 |

OTHER PUBLICATIONS

"Office Action of China Counterpart Application," dated Jul. 12, 2019, p. 1-p. 8.

* cited by examiner

*Primary Examiner* — Philip C Tucker
*Assistant Examiner* — Jimmy R Smith, Jr.
(74) *Attorney, Agent, or Firm* — JCIPRNET (57) ABSTRACT

The invention relates to a 3-D printing apparatus including a tank, a platform, a fixture, a solidifying module and a control module. The tank is flexible and filled with a liquid-state forming material. The platform is disposed in the tank. The control module drives the fixture to deform the tank, so as to form a first gap between the platform and a bottom of the tank for the liquid-state forming material to flow in. The solidifying module in controlled by the control module to solidify the liquid-state forming material between the platform and the bottom of the tank, so as to form a solidified layer. The invention can effectively reduce a processing time for manufacturing each solidified layer, such that an overall processing time can be reduced to achieve preferable molding efficiency.

11 Claims, 8 Drawing Sheets

3-D PRINTING APPARATUS

CROSS-REFERENCE TO RELATED APPLICATION

This application claims the priority benefit of China application serial no. 201611087797.9, filed on Dec. 1, 2016. The entirety of the above-mentioned patent application is hereby incorporated by reference herein and made a part of this specification.

BACKGROUND OF THE INVENTION

1. Field of the Invention

The invention relates to a 3-D printing apparatus.

2. Description of Related Art

Along with progressive development of technology, different methods for constructing three-dimensional (3-D) models by using additive manufacturing technology such as layer-by-layer model constructing, have been developed. Generally, the additive manufacturing technology is to convert design data of a 3-D model constructed by software, such as computer aided design (CAD), into a plurality of continuously stacked thin (quasi two-dimensional (2D)) cross-section layers.

Many ways to form a plurality of thin cross-section layers have been developed at present. For example, a movable platform may be disposed in a liquid-state forming material, and an X-Y-Z coordinate system constructed according to the design data of the 3-D model drives a light source to move along the X-Y coordinate and irradiate the liquid-state forming material, so as to solidify the liquid-state forming material into a correct shape of the cross-sectional layers. Then, as the movable platform moves along the Z-axis, a molding space is formed between the movable platform and a bottom of the tank filled with the liquid-state forming material, and the liquid-state forming material is solidified in the molding space. Thereby, a 3-D object can be formed after the aforementioned steps are performed for several times.

However, in general, each cross-section layer is thin. In other words, a molding gap has a height on the Z-axis. Meanwhile, the liquid-state forming material is generally a liquid with high viscosity. Thus, it is difficult for the liquid-state forming material to flow into the molding gap, and the process of waiting the liquid-state forming material to fill up the molding gap is often time-consuming, which results in lack of efficiency due to long processing time.

SUMMARY OF THE INVENTION

The invention provides a three-dimensional (3-D) printing apparatus having preferable molding efficiency.

According to an embodiment of the invention, a 3-D printing apparatus including a tank, a platform, a fixture, a solidifying module and a control module is provided. The tank is flexible and filled with a liquid-state forming material. The platform is disposed in the tank. The fixture is disposed at the tank. The solidifying module is disposed at the tank. The control module is connected with the solidifying module and the fixture, and connected with at least one of the platform and the tank to drive the tank and the platform to move relatively. The control module drives the fixture to deform the tank, so as to form a first gap between the platform and a bottom of the tank for the liquid-state forming material to flow in. The solidifying module is controlled by the control module to solidify the liquid-state forming material between the platform and the bottom of the tank to form a solidified layer.

To sum up, in the 3-D printing apparatus provided by the embodiments of the invention, the fixture is controlled by the control module to change a shape of the flexible tank, such that the first gap is formed between the platform and the bottom of the tank for the liquid-state forming material to flow in. In this way, the liquid-state forming material can fill up the first gap in a faster speed. When the tank is at a second position, the superfluous liquid-state forming material flows out due to being influenced by a deformation force. Thus, the 3-D printing apparatus of the invention can effectively reduce the processing time for manufacturing each solidified layer, such that the overall process time is reduced to achieve preferable molding efficiency.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

FIG. 1A to FIG. 1D are respectively side views illustrating a three-dimensional (3-D) printing apparatus in different states according to an embodiment of the invention. Referring to FIG. 1A, FIG. 1B, FIG. 1C and FIG. 1D simultaneously, in the present embodiment, a 3-D printing apparatus 100 is adapted for forming a 3-D object. The 3-D printing apparatus 100 is, for example, a stereo lithography (SL) 3-D printing apparatus or a digital light processing (DLP) 3-D printing apparatus, but the invention is not limited thereto.

Specifically, in the present embodiment, the 3-D printing apparatus 100 includes a tank 110, a platform 120, a fixture 130, a solidifying module 140 and a control module 150. The tank 110 is flexible and filled with a liquid-state forming material 50. The platform 120 is disposed in the tank 110. The fixture 130 is disposed at the tank 110. The solidifying module 140 is disposed at tank 110. To be more specific, the solidifying module 140 is disposed, for example, under the tank 110. The control module 150 is connected with the solidifying module 140 and the fixture 130. Moreover, the control module 150 is connected with at least one of the platform 120 and the tank 110 to drive the tank 110 and the platform 120 to move relatively. The control module 150 drives the fixture 130 to deform the tank 110, such that the tank 110 changes between a first position (as illustrated in FIG. 1B) and a second position (as illustrated in FIG. 1C and FIG. 1D). To be more specific, in the present embodiment, the 3-D printing apparatus 100 further includes an isolation medium 160. The isolation medium 160 is disposed on a bottom 114 of the tank 110. To be specific, the control module 150 drives the fixture 130 to deform the tank 110 to form a first gap G1 or a second gap G2 between the platform 120 and the isolation medium 160. The first gap G1 is larger than the second gap G2. How the control module 150 changes a shape of the tank 110 to make the tank 110 sequentially locate at the first position with the first gap G1 and the second position with the second gap G2 will be described in detail in the following paragraphs.

Broadly speaking, the tank 110 has flexibility and thus, may receive a force to cause the bottom 114 thereof to change between the first position and the second position. In this case, the first position and the second position may be further considered positions for the bottom 114 of the tank 110 to change to. Therefore, whether the gaps are generated may determine whether the liquid-state forming material 50 may accordingly flow in or not, such that when the liquid-state forming material 50 is incapable of fast flowing in the gaps due to the platform 120 moving up, the liquid-state forming material 50 may still fill the gaps, so as to reduce a waiting time in a manufacturing process.

Figure 1A:
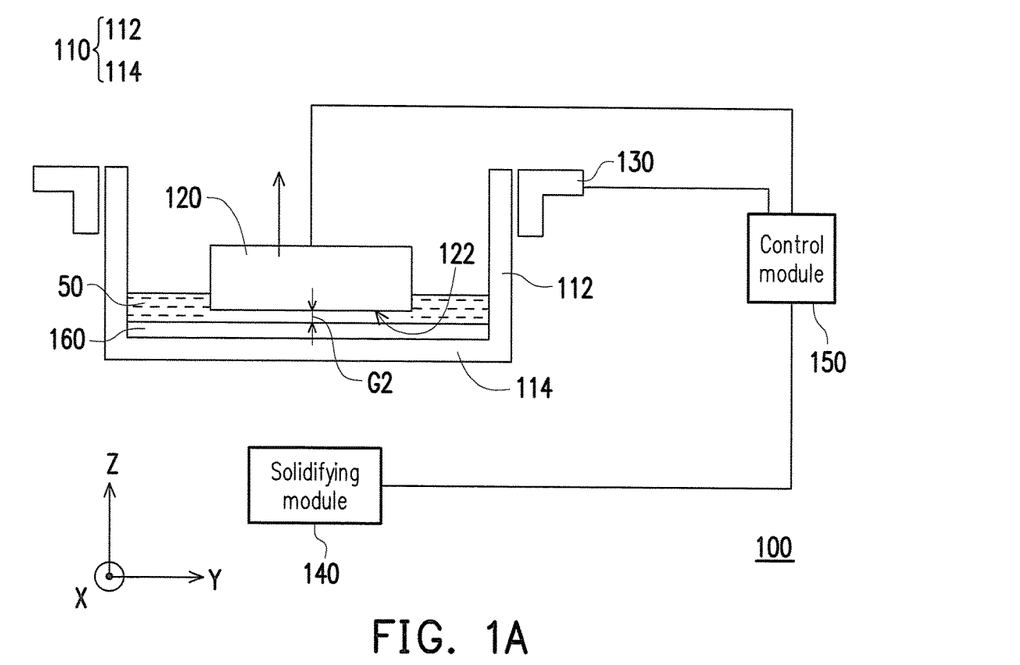
FIG. 1A to FIG. 1D are respectively side views illustrating a three-dimensional (3-D) printing apparatus in different states according to an embodiment of the invention.
Figure 1B:
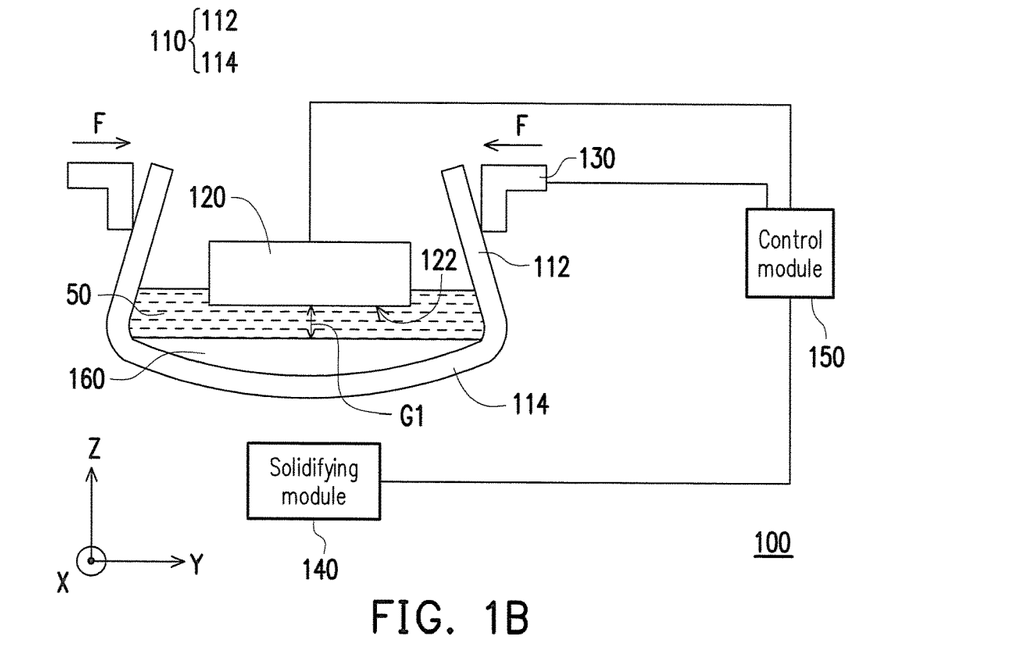
Figure 1C:
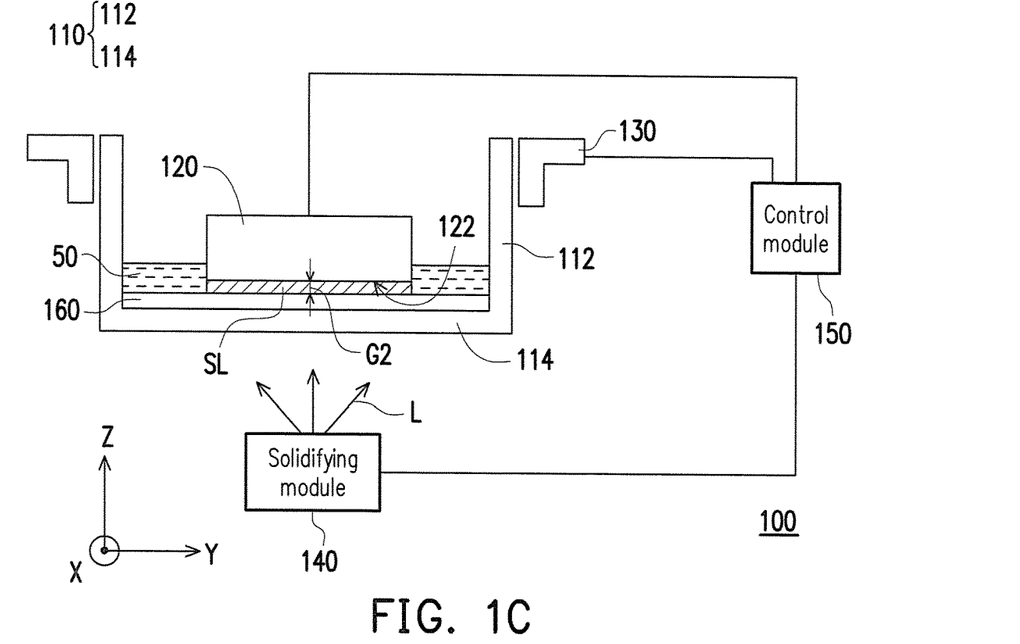
Figure 1D:
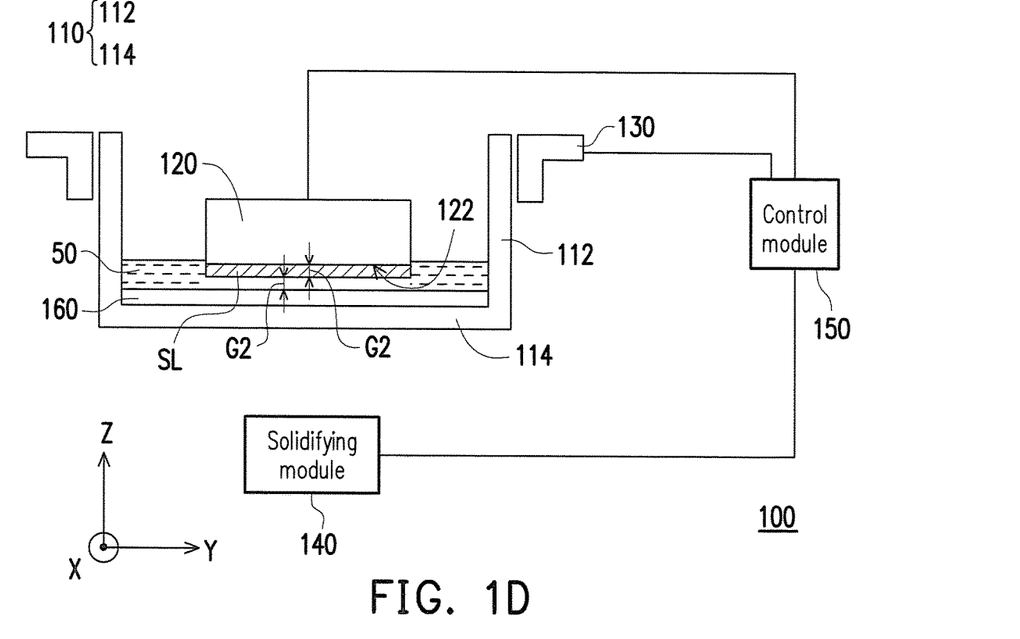

Referring to FIG. 1A first, specifically, in the present embodiment, the bottom 114 of the tank 110 is a plane when being undeformed. The second gap G2 exists between the bottom 114 of the tank 110 and the platform 120 before the control module 150 drives the fixture 130 to deform the tank 110. The control module 150 drives at least one of the platform 120 and the tank 110 according to molding information, such that the platform 120 moves away from the isolation medium 160, and the second gap G2 is formed between the platform 120 and the bottom 114 of the tank 110 by the control module 150 according to the molding information. In the present embodiment, the molding information includes, for example, a thickness of a solidified layer SL which is planned to be formed, but the invention is not limited thereto. That is, a height of the second gap G2 is the thickness of the solidified layer SL planned to be formed. Additionally, in the present embodiment, the control module 150, for example, drives the platform 120 to move along the Z-axis to make the platform 120 move away from the isolation medium 160. In other embodiments, the control module 150 may also drive the tank 110 to move in an opposite direction along the Z-axis to make the platform 120 move away from the isolation medium 160, but the invention is not limited thereto.

Referring to FIG. 1A again, in the present embodiment, the liquid-state forming material 50 is, for example, a photosensitive resin, but the invention is not limited thereto. In this circumstance, a viscosity of the liquid-state forming material 50 (i.e., the photosensitive resin) is large, and the height of the second gap G2 is small, such that it is difficult to inject the liquid-state forming material 50 into the second gap G2. Generally, a size of the second gap G2 is, for example, smaller than 100 μm. When the viscosity of the photosensitive resin is greater than 100 pascal-second (which is equal to 1000 cp), it is difficult for the photosensitive resin to flow into the second gap G2.

Then, referring to FIG. 1B again, the control module 150 drives the fixture 130 to deform the tank 110 to make the tank 110 locate at the first position. When the tank 110 is located at the first position, the control module 150 drives the fixture 130 to change the shape of the tank 110, such that the smaller second gap G2 depicted in FIG. 1A is deformed into the larger first gap G1 depicted in FIG. 1B. To be more specific, the control module 150 drives the fixture 130 to apply a force F to deform the tank 110, such that the second gap G2 is deformed into the first gap G1, and the liquid-state forming material 50 around the platform 120 is injected into the first gap G1. To be specific, the tank 110 further has a side wall 112 connected with the bottom 114. The fixture 130 is disposed at the side wall 112 of the tank 110. The control module 150 controls the fixture 130 to apply the force F to the side wall 112 of the tank 110 to deform the tank 110 and make the tank 110 locate at the first position. Thus, the bottom 114 of the tank 110 is deformed from the plane into an arc surface curved downward, such that a space of the bottom 114 of the tank 110 is accordingly increased, and the liquid-state forming material 50 flows down to fill the increased space. Specifically, a height of the first gap G1 is at least 2 millimeters (mm) for the liquid-state forming material 50 around the platform 120 to be injected into the first gap G1. Referring to FIG. 1A and FIG. 1B simultaneously, a speed of the liquid-state forming material 50 around the platform 120 flowing into the second gap G2 is less than a speed of the liquid-state forming material 50 flowing into the first gap G1.

Then, referring the FIG. 1C again, the control module 150 drives the fixture 130 to deform the tank 110 and make the tank 110 locate at the second position. To be more specific, the control module 150 drives the fixture 130 to remove the force F and restitute the tank 110, such that the first gap G1 illustrated in FIG. 1B restitutes to the second gap G2 illustrated in FIG. 1C. In this circumstance, the superfluous liquid-state forming material flows out due to being influenced by the deformation force. Then, the solidifying module 140 is controlled by the control module 150 to solidify the liquid-state forming material 50 between the platform 120 and the bottom 114 of the tank 110 to form the solidified layer SL. Specifically, the solidifying module 140 solidifies the liquid-state forming material 50 in the second gap G2 to form the solidified layer SL. To be more specific, the solidifying module 140 is, for example, a solidifying light source. For example, the solidifying light source is, for example, an ultraviolet (UV) solidifying light source, but the invention is not limited thereto. The tank 110 is, for example, a light-transmissive tank. The solidifying light source 140 is controlled by the control module 150 to emit UV light L, such that the UV light L passing through the tank 110 solidifies the liquid-state forming material 50 (i.e., the photosensitive resin) in the second gap G2 to form the solidified layer SL.

Referring to FIG. 1D, after the solidified layer SL is formed, the control module 150 drives at least one of the platform 120 and the tank 110 according to the molding information to make the platform 120 move far away from the isolation medium 160, and the second gap G2 is formed between the platform 120 and bottom 114 of the tank 110 by the control module 150 according to the molding information, which is ready for forming a next solidified layer SL. Based on the above, after the aforementioned steps are performed by the 3-D printing apparatus 100 of the present embodiment for one or more times, multiple solidified layers SL are one by one solidified and stacked on a surface 122 (i.e., a molding plane) of the platform 120, and finally, a 3-D object is formed.

Additionally, the number of the solidifying module 140 and the position thereof corresponding to the tank 110 are not limited the present embodiment. Although the solidifying module 140 is illustrated as being under the tank 110 in the present embodiment, the solidifying module 140 may be substantially disposed correspondingly according to conditions required by molding. In other words, the solidifying module 140 may be located at any position near the tank 110 in a premise that the solidifying module 140 is capable of effectively solidifying the liquid-state forming material 50 for molding.

It should be noted that in the present embodiment, the isolation medium 160 is, for example, an isolation solution or a coating. A material of the isolation solution is, for example, a material which has a density higher than the liquid-state forming material 50 and is not miscible with the liquid-state forming material 50. Specifically, the isolation solution is, for example, brine. A material of the coating is, for example, polytetrafluoroethene (PTFE) or polydimethylsiloxane (PDMS). The isolation medium 160 is used for reducing adhesion between the solidified layer SL and the tank 110, such that the formed solidified layer SL may be smoothly separated from the bottom 114 of the tank 110.

According to the description set forth above, in the 3-D printing apparatus 100 of the present embodiment, through the control module 150 controlling the fixture 130 to change the shape of the flexible tank 110, the first gap G1 is formed between the platform 120 and the bottom 114 of the tank 110 for the liquid-state forming material 50 to flow in. In this way, the liquid-state forming material 50 may fill up the first gap G1 in a faster speed. When the tank 110 is at the second position, the superfluous liquid-state forming material 50 flows out due to being influenced by the deformation force. The solidifying module 140 is controlled to solidify the liquid-state forming material 50 in the second gap G2 to form the solidified layer SL. Thus, the 3-D printing apparatus 100 of the present embodiment is capable of reducing the processing time for manufacturing each solidified layer SL, such that an overall processing time can be reduced to achieve preferable molding efficiency.

It should be noted that part of the content related to the embodiment above is applied to the embodiments provided below, in which the same technical description is omitted, while terms of the same parts may refer to part of the content with respect to the embodiment above and will not be repeated.

FIG. 2A to FIG. 2D are respectively side views illustrating a 3-D printing apparatus in different states according to another embodiment of the invention. A 3-D printing apparatus 100a illustrated in FIG. 2A to FIG. 2D is substantially similar to the 3-D printing apparatus 100 illustrated in FIG. 1A to FIG. 1C, and the main difference therebetween will be described below.

Figure 2A:
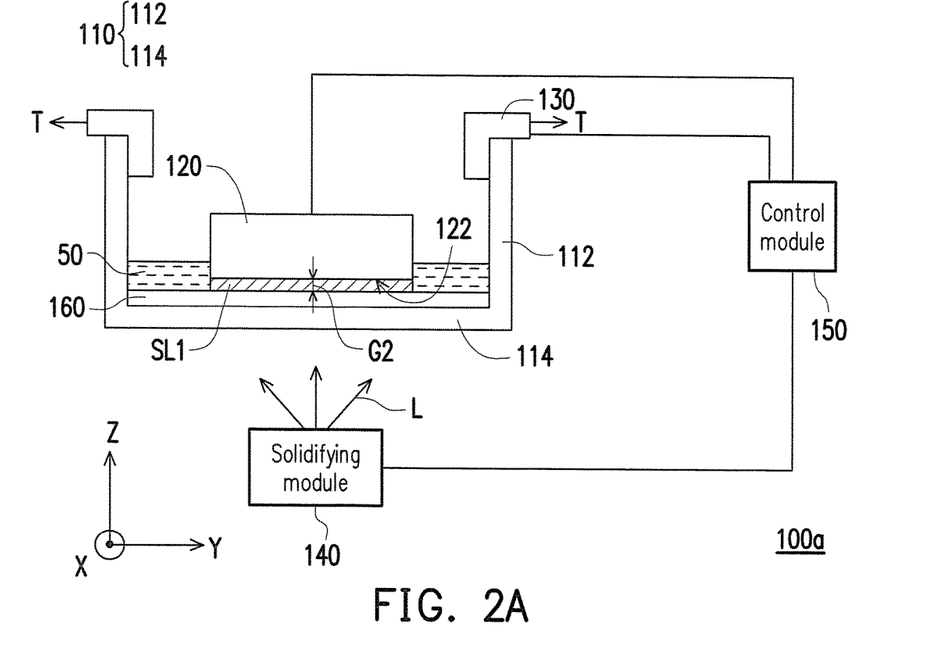
FIG. 2A to FIG. 2D are respectively side views illustrating a 3-D printing apparatus in different states according to another embodiment of the invention.
Figure 2B:
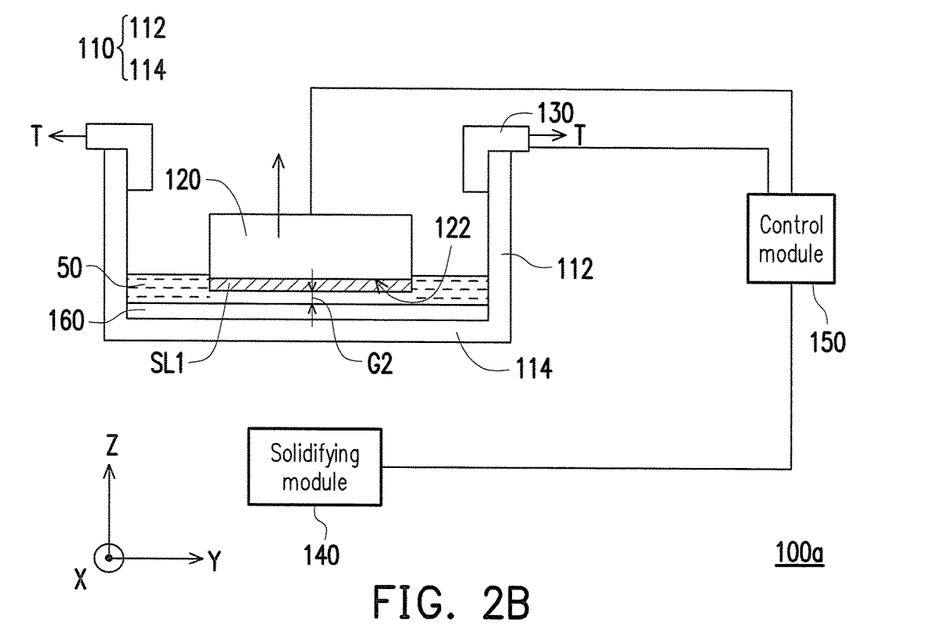
Figure 2C:
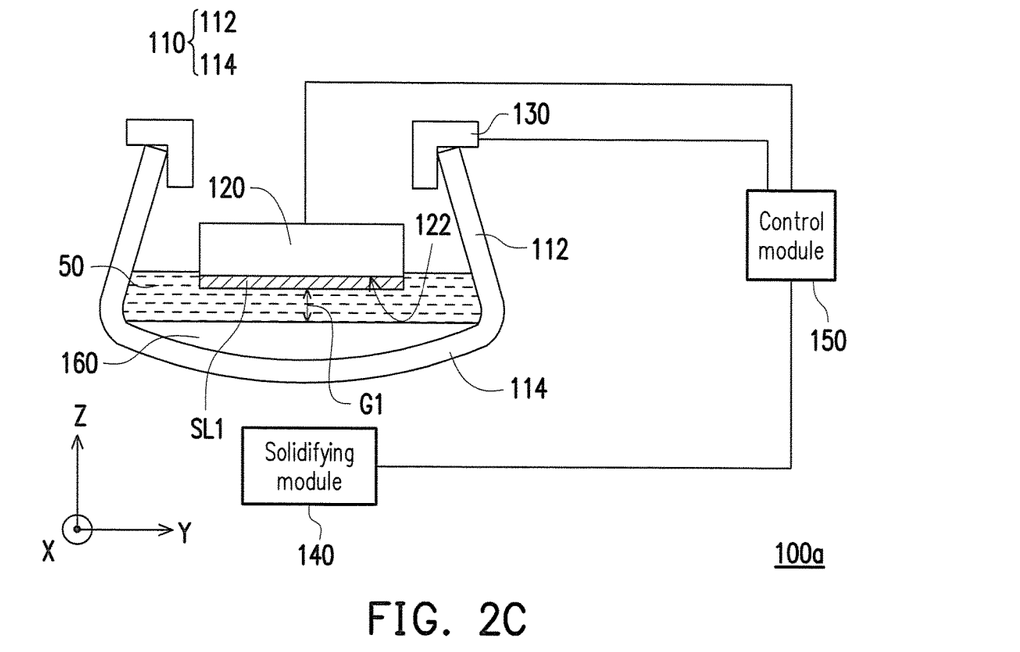

Referring to FIG. 2A and FIG. 2C first, in the present embodiment, the bottom 114 of the tank 110 is an arc surface when being undeformed, and the tank 110 is naturally curved downward, for example. Thus, the liquid-state forming material 50 fills up a gap between the platform 120 and the isolation medium 160 before the tank 110 is deformed. First, the control module 150 drives the fixture 130 to apply a tension force T and deform the tank 110. Then, the control module 150 controls the platform 120 to move upward with respect to the liquid-state forming material 50 along the Z-axis, such that the second gap G2 is formed between the platform 120 and the isolation medium 160. In this circumstance, the liquid-state forming material 50 is located in the second gap G2. Then, the control module 150 controls the solidifying module 140 to emit UV light L to solidify the liquid-state forming material 50 in the second gap G2 by using the UV light L to form a solidified layer SL1.

Then, referring to FIG. 2B, when the 3-D printing apparatus 100a continues to form a next solidified layer SL2, the control module 150 turns off the solidifying module 140 from emitting the UV light L. Then, the control module 150 controls the platform 120 to move upward with respect to the liquid-state forming material 50 along the Z-axis according to the molding information, such that the second gap G2 (i.e., the tank 110 is at the second position) is formed between the platform 120 and the isolation medium 160. In this circumstance, due to the large viscosity of the liquid-state forming material 50 (i.e., the photosensitive resin) and the small height of the second gap G2, it is difficult to inject the liquid-state forming material 50 into the second gap G2.

Referring to FIG. 2C again, the control module 150 drives the fixture 130 to adjust the shape of the tank 110, such that the second gap G2 is deformed into the first gap G1 (i.e., the tank 110 is changed to locate at the first position). Specifically, the control module 150 drives the fixture 130 to remove the force T and restitute the tank 110, such that the smaller second gap G2 restitutes to the larger first gap G1 for the liquid-state forming material 50 around the platform 120 to inject into the first gap G1. In this circumstance, the bottom 114 of the tank 110 restitutes from the plane to the curved downward arc surface. In this way, the space of the bottom 114 of the tank 110 is increased, such that the isolation medium 160 and the liquid-state forming material 50 flows down to fill the increased space along the bottom 114.

Figure 2D:
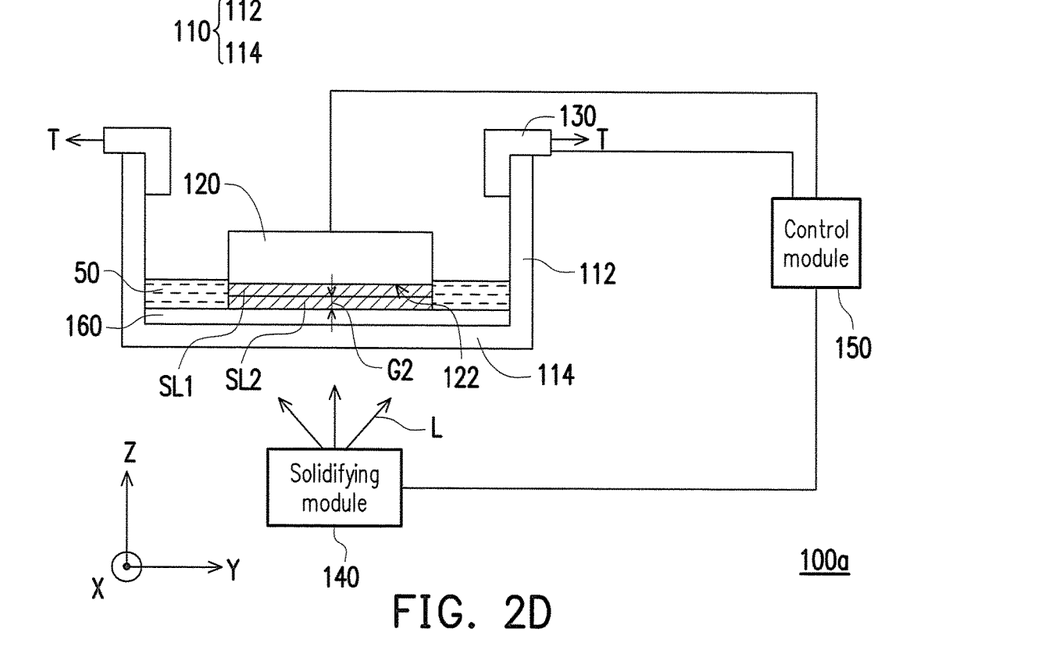

Then, referring to FIG. 2D, the control module 150 drives the fixture 130 to deform the tank 110. Specifically, the control module 150 applies the tension force T to deform the tank 110, such that the first gap G1 is deformed into the second gap G2 (i.e., the tank 110 is located at the second position). Then, the solidifying module 140 is controlled to solidify the liquid-state forming material 50 in the second gap G2 to form the solidified layer SL2. Based on the above, after the aforementioned steps are performed by the 3-D printing apparatus 100a of the present embodiment for one or more times, each layer is one by one solidified and stacked on the surface 122 (i.e., the molding plane) of the platform 120, and finally, a 3-D object is formed.

Figure 3A:
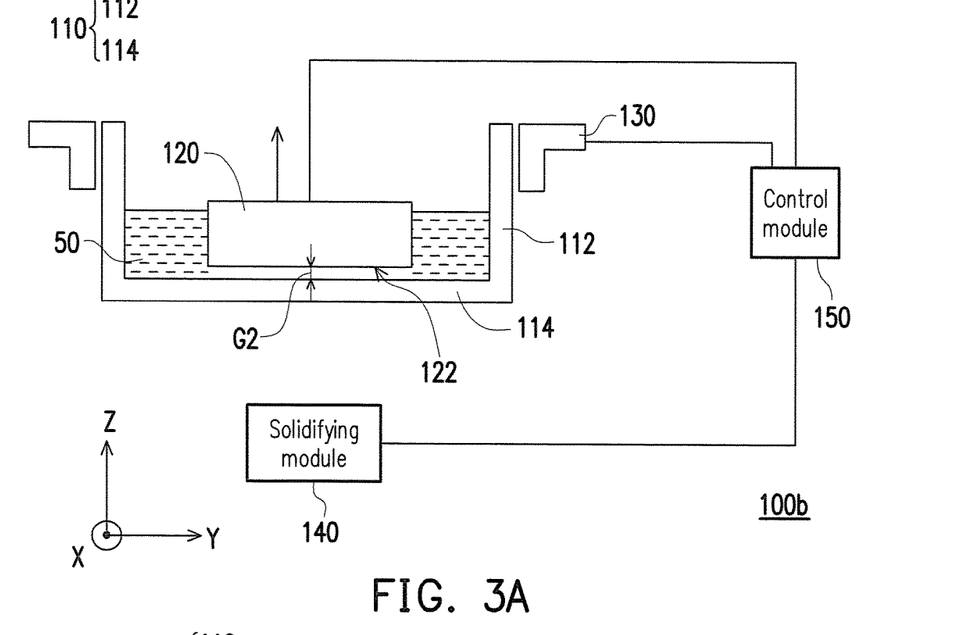
FIG. 3A to FIG. 3D are respectively side views illustrating a 3-D printing apparatus in different states according to yet another embodiment of the invention.
Figure 3B:
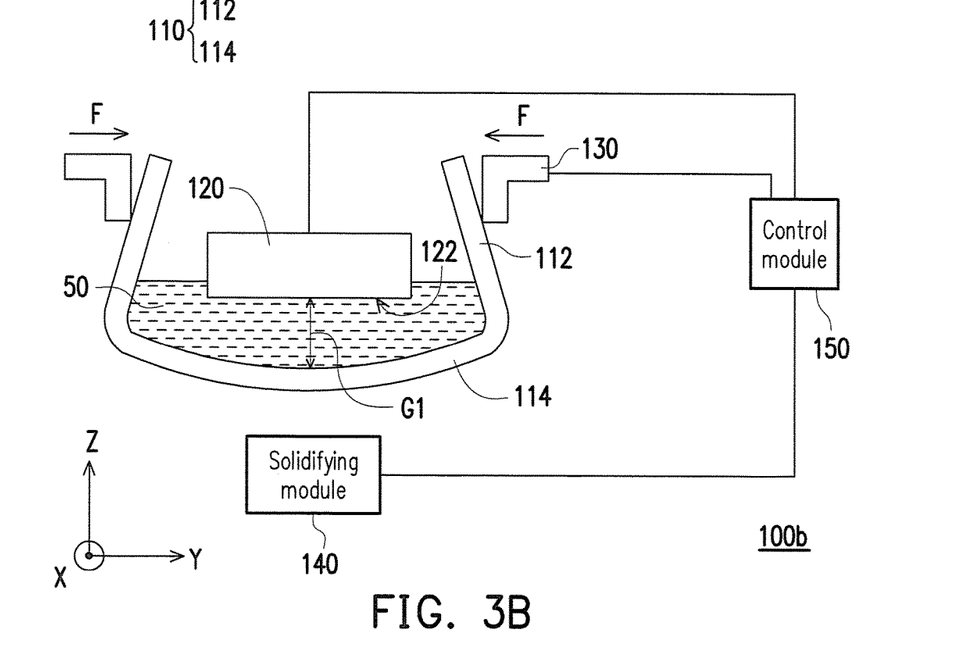
Figure 3C:
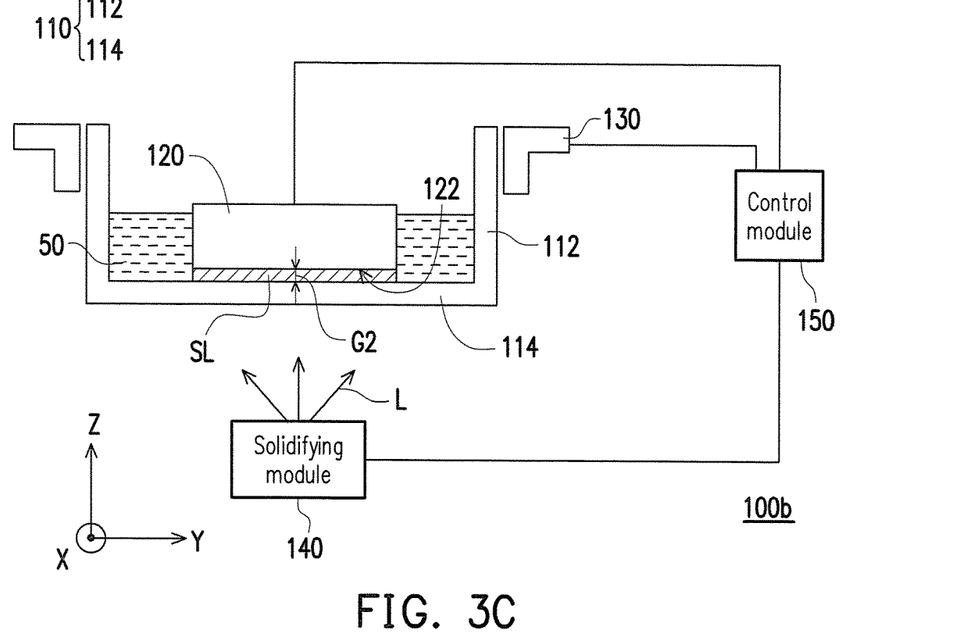
Figure 3D:
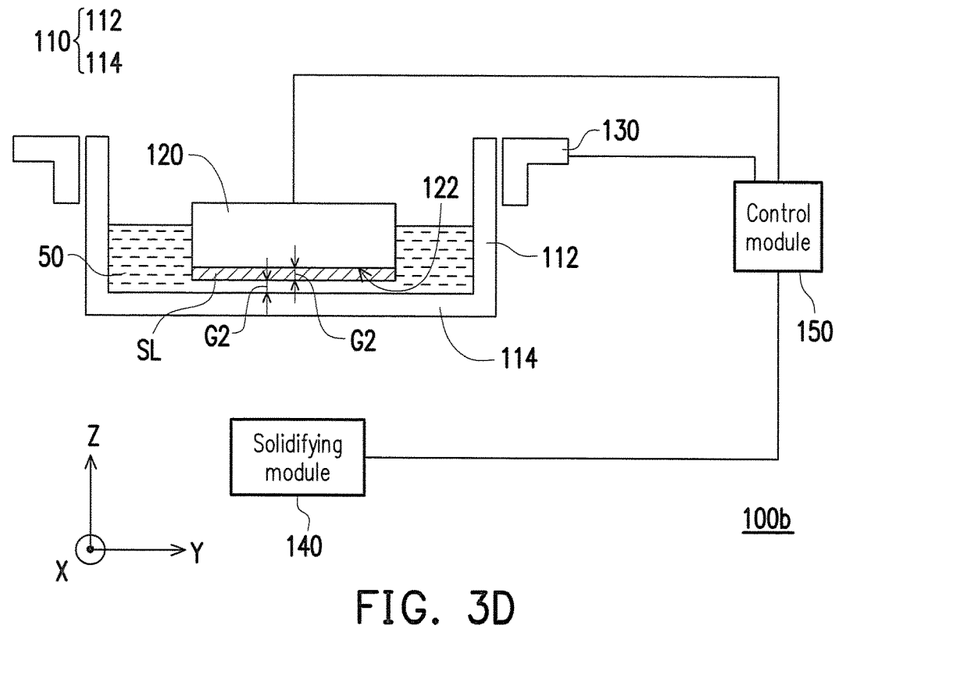

FIG. 3A to FIG. 3D are respectively side views illustrating a 3-D printing apparatus in different states according to yet another embodiment of the invention. It should be noted that the difference between the first gap G1 and the second gap G2 is exaggeratedly illustrated for clear identification. A 3-D printing apparatus 100b illustrated in FIG. 3A to FIG. 3D is substantially similar to the 3-D printing apparatus 100 illustrated in FIG. 1A to FIG. 1C, and the main difference therebetween lies in the 3-D printing apparatus 100b not including the isolation medium 160. In the present embodiment, when the tank 110 is at the first position (as illustrated in FIG. 3B), the first gap G1 is formed between the platform 120 and the bottom 114 of the tank 110. The liquid-state forming material 50 around the platform 120 is injected into the first gap G1. When the tank 110 is at the second position, the second gap G2 is formed between the platform 120 and the bottom 114 of the tank 110, and the solidifying module 140 is controlled to solidify the liquid-state forming material 50 in the second gap G2 to form the solidified layer SL (as illustrated in FIG. 3C). Other description related to the present embodiment is similar to that related to the 3-D printing apparatus 100 illustrated in FIG. 1A to FIG. 1D and will not be repeated.

Figure 4A:
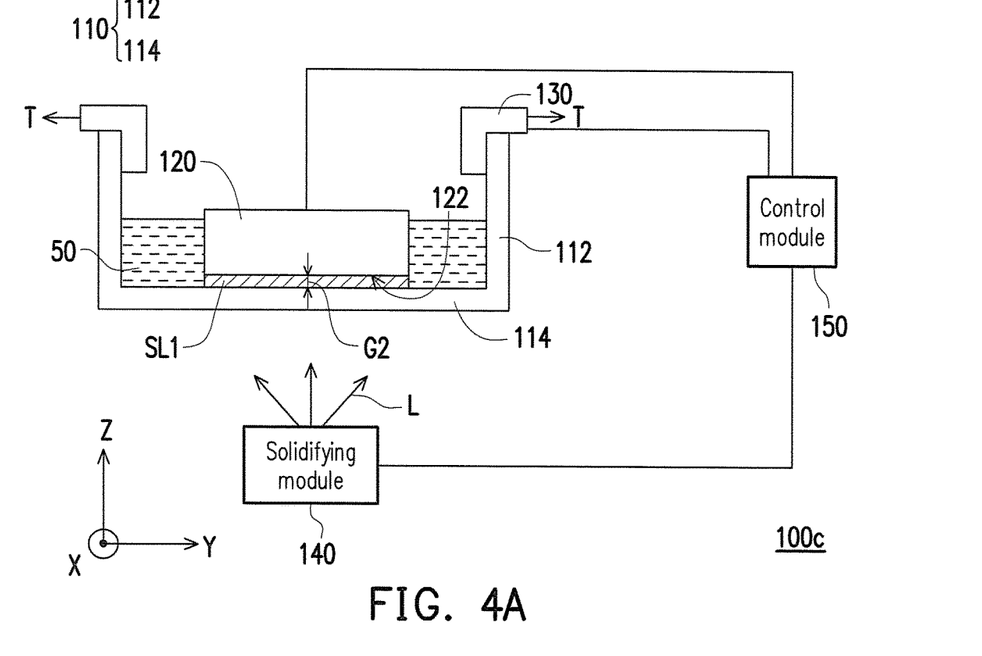
FIG. 4A to FIG. 4D are respectively side views illustrating a 3-D printing apparatus in different states according to still another embodiment of the invention.
Figure 4B:
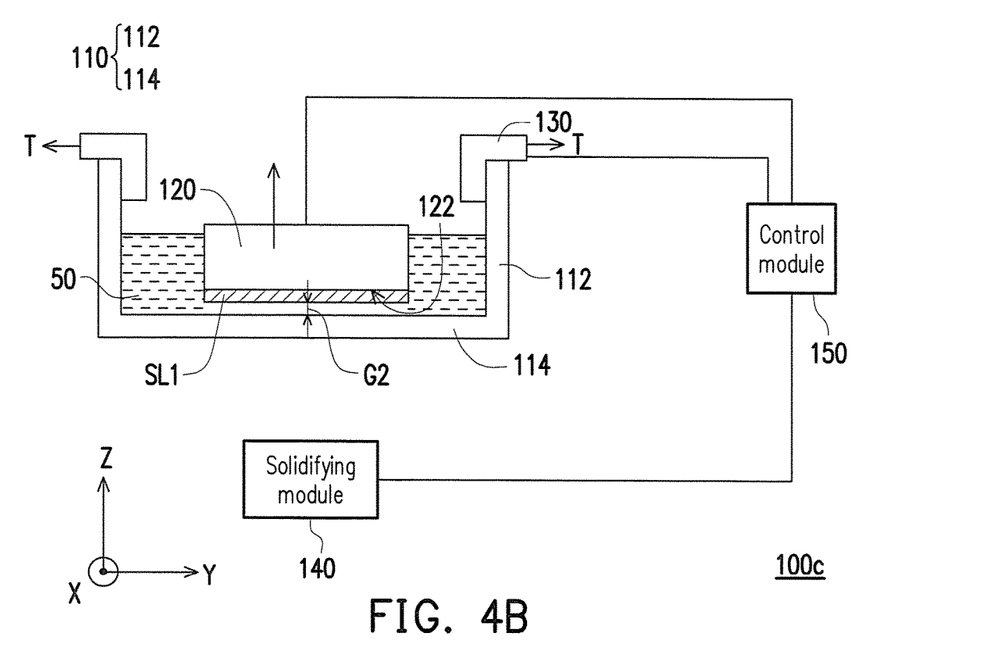
Figure 4C:
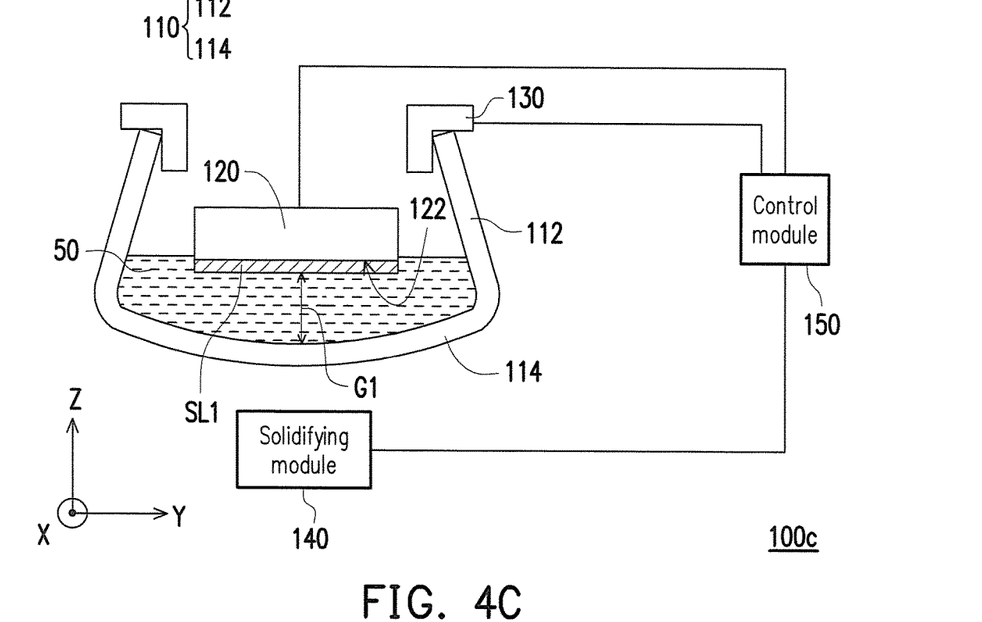
Figure 4D:
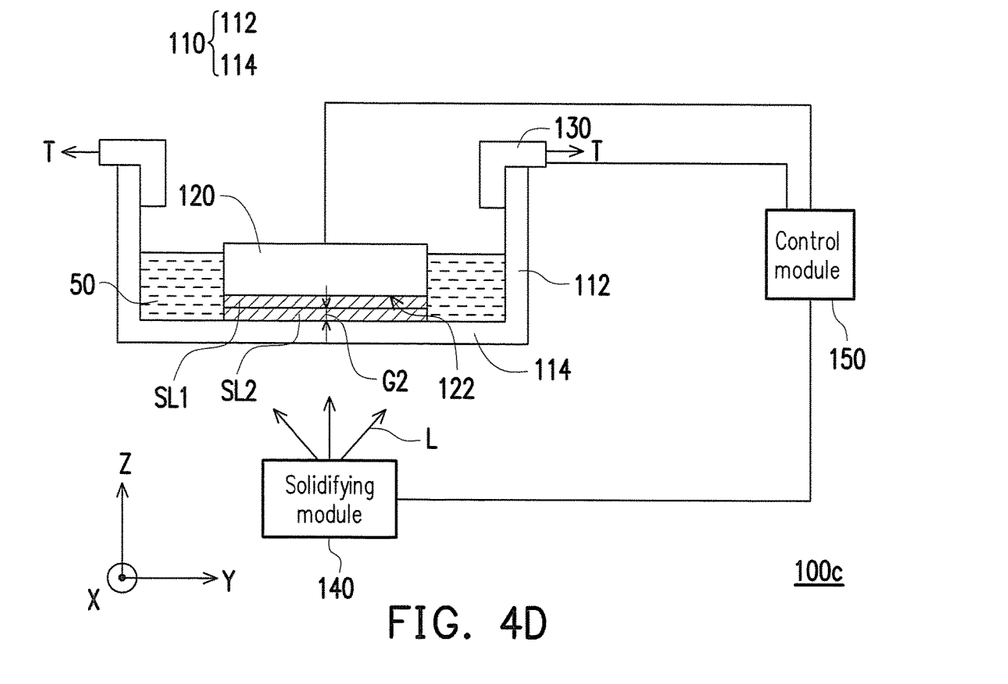

FIG. 4A to FIG. 4D are respectively side views illustrating a 3-D printing apparatus in different states according to still another embodiment of the invention. It should be noted that the difference between the first gap G1 and the second gap G2 is exaggeratedly illustrated for clear identification. A 3-D printing apparatus 100c illustrated in FIG. 4A to FIG. 4D is substantially similar to the printing apparatus 100b illustrated in FIG. 2A to FIG. 2D, and the main difference therebetween lies in the 3-D printing apparatus 100c not including the isolation medium 160. In the present embodiment, when the tank 110 is at the first position (as illustrated in FIG. 4C), the first gap G1 is formed between the platform 120 and the bottom 114 of the tank 110. The liquid-state forming material 50 around the platform 120 is injected into the first gap G1. When the tank 110 is at the second position (as illustrated in FIG. 4D), the second gap G2 is formed between the platform 120 and the bottom 114 of the tank 110, and the solidifying module 140 is controlled to solidify the liquid-state forming material 50 in the second gap G2 to form the solidified layer SL2. Other description related to the present embodiment is similar to that related to the 3-D printing apparatus illustrated in FIG. 2A to FIG. 2D and will not be repeated.

Based on the above, in the 3-D printing apparatus provided by the embodiments of the invention, the first gap is formed between the platform and the bottom of the tank through the control module controlling the fixture to change the shape of the flexible tank for the liquid-state forming material to flow in. In this way, the liquid-state forming material can fill up the first gap faster. When the tank is at the second position, the superfluous liquid-state forming material flows out due to being influenced by the deformation force, and the solidifying module is controlled to solidify the liquid-state forming material in the second gap to form the solidified layer. Thus, the 3-D printing apparatus provided by the embodiments of the invention can reduce the processing time for manufacturing each solidified layer, such that an overall processing time can be reduced to achieve preferable molding efficiency.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A three-dimensional (3-D) printing apparatus, comprising:
   a tank, being flexible and filled with a liquid-state forming material;
   a platform, disposed in the tank;
   a fixture, disposed at the tank;
   a solidifying module, disposed at the tank; and
   a control module, connected with the solidifying module and the fixture, and connected with at least one of the platform and the tank to drive the tank and the platform to move relatively to one another,
   wherein the control module drives the fixture to deform the tank, so as to form a first gap between the platform and a bottom of the tank for the liquid-state forming material to flow in, and the solidifying module is controlled by the control module to solidify the liquid-state forming material between the platform and the bottom of the tank to form a solidified layer,
   wherein the tank comprises a side wall connected with the bottom, the fixture is disposed at an upper portion of the side wall, and the control module controls the fixture to apply force to the side wall from an exterior or an interior of the tank to deform the tank, the side wall is bended toward a center of the bottom of the tank, and the bottom is deformed into a concave shape for forming the first gap.

2. The 3-D printing apparatus according to claim 1, wherein the bottom of the tank is an arc surface when not deformed.

3. The 3-D printing apparatus according to claim 1, wherein a height of the first gap is at least 2 millimeters (mm).

4. The 3-D printing apparatus according to claim 1, wherein the 3-D printing apparatus is a stereo lithography (SL) 3-D printing apparatus or a digital light processing (DLP) 3-D printing apparatus.

5. The 3-D printing apparatus according to claim 1, further comprising an isolation medium disposed on the bottom of the tank, and the first gap being located between the isolation medium and the platform.

6. The 3-D printing apparatus according to claim 5, wherein the isolation medium is an isolation solution or a coating.

7. The 3-D printing apparatus according to claim 6, wherein a material of the coating is polytetrafluoroethene (PTFE) or polydimethylsiloxane (PDMS).

8. The 3-D printing apparatus according to claim 6, wherein the isolation solution is brine.

9. The 3-D printing apparatus according to claim 1, wherein a second gap is formed between the bottom of the tank and the platform before the control module drives the fixture to deform the tank, the second gap is smaller than the first gap, and a speed of the liquid-state forming material around the platform flowing into the second gap is less than a speed of the liquid-state forming material flowing into the first gap.

10. The 3-D printing apparatus according to claim 1, wherein a second gap is formed between the bottom of the tank and the platform before the control module drives the fixture to deform the tank, and a thickness of the second gap is equal to a thickness of the solidified layer.

11. The 3-D printing apparatus according to claim 1, wherein a method of the control module driving the fixture to deform the tank comprises applying a force to the tank or removing the force from the tank.

* * * * *